United States Patent Office 3,342,903
Patented Sept. 19, 1967

3,342,903
PENTAERYTHRITOL PHOSPHORIC ACID ESTERS
Herbert Grabhofer, Cologne-Flittard, Herbert Müller, Leverkusen, Rolf-Fred Posse, Cologne-Flittard, and Hans Ulrich, Leverkusen, Germany, assignors to Agfa Aktiengesellschaft, Leverkusen, Germany, a corporation of Germany
No Drawing. Filed June 22, 1964, Ser. No. 377,043
4 Claims. (Cl. 260—927)

This invention relates to new spirocyclic phosphoric acid esters. More particularly the invention relates to such esters prepared from the reaction of spirocyclic pentaerythritol-di-phosphoric acid monohalides with polyglycols.

This application is a continuation-in-part of Ser. No. 286,924, filed June 11, 1963, and titled "Pentaerythritol Phosphoric Acid Ester Sensitizers for Photographic Emulsions," now U.S. Patent 3,169,863 granted Feb. 17, 1965.

The spirocyclic pentaerythritol-di-phosphoric acid monohalides used as one starting material have the following formula:

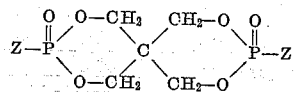

wherein Z is halogen and preferably chlorine. These monohalides are also known as pentaerythritol esters of phosphorochloridic acid.

Polyglycols which may be reacted with the monohalides to produce the esters according to this invention have the following formula:

wherein $n$ is greater than three, for example, from 3 to 100 and preferably 4 to 50. In the reaction the glycols are preferably used in amounts from about 1 to 2 moles per mole of the halides.

The products obtained from the reaction of the above components are generally water-soluble and have the following formula:

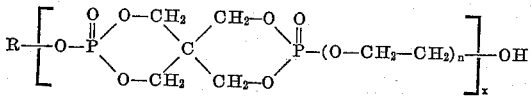

wherein $n$ is greater than 3, for example, 3 to 100 and preferably 4 to 50 and the degree of condensation, X, of the product of esterification is 1 or more, for example, 1–100 and preferably 1 to 10. R in the above formula represents H or H$($O—CH$_2$—CH$_2)_n$ wherein $n$ is defined as above.

The phosphoric acid esters according to the invention are prepared by the usual methods used for esterification, and the degree of condensation of the esters may be influenced in the desired direction by varying the reaction time, the reaction temperature and the molar proportions of the reaction components. The condensation may for instance be carried through in a liquid alkaline medium, such as in pyridine or triethylamine or other tertiary amines, at temperatures of about 0 to 80° C., preferably 10 to 50° C.

The new spirocyclic phosphoric acid esters find utility in the photographic art. In the graphic arts field, particularly for the production of screened images more and more films are being used which are marketed as so-called lithographic or line films and which can be developed to very high gamma values and therefore sharp raster points in developers which contain formaldehyde. Although the processing of such films in developers containing formaldehyde give excellent results, it must be carried out with great care. The interval during development at which a sharp raster point is obtained, i.e., the steepest gamma, is very short. It amounts to approximately between ½ and 1½ minutes.

It is known to add phosphorylated alkylene oxide derivatives to protographic silver halide emulsions in order to improve the mechanical properties thereof. However, these compounds are unsuitable for obtaining a high contrast.

It has been found that the gamma values of photographic emulsions and the period during development in which an extremely high gamma-value is obtained can be increased, so that development can be carried out much more effectively and conveniently, if the development is carried out in the presence of the new spirocyclic phosphoric acid esters.

The effect of these compounds in the development of lithographic films was very unexpected in view of the fact that short chained polyethylene glycols as well as octaethylene glycol are ineffective. Furthermore, spirocyclic compounds with carbon as the ring atom, for example, compounds of the formula below wherein $n$ and X have the meaning given above:

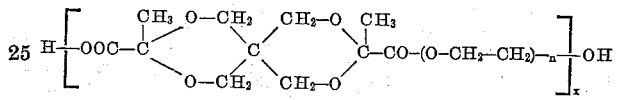

do not produce the extremely high gamma values obtainable with the new esters.

The following examples will serve to illustrate the esters and their method of production according to the invention. It is to be understood that these examples are illustrative only, and they are not to be considered as limiting the scope of this invention.

EXAMPLE I (a) 136 g. of pentaerythritol are introduced in 500 cc. of phosphorus oxychloride and heated in a steam bath with stirring. The pentaerythritol dissolves in 30 to 45 minutes, hydrochloric acid thus being formed, and a pentaerythritol-di-(phosphoric acid monochloride) of the formula:

Ia
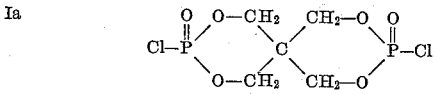

is deposited in the form of colorless crystals which have a melting point of 243–245° C.

The crystals may be isolated by suction filtration after some of the phosphorus oxychloride has been removed by evaporation in vacuo, and the crystals may then be washed with methylene chloride on the suction filter.

(b) 30 g. of the ester chloride (Ia) described above are added in portions with stirring to a mixture of 37.2 g. octaethylene glycol and 31.2 g. of pyridine, the temperature gradually rising to 35° C. After 4 hours the mixture is poured onto ice, adjusted to pH 3 with 2 N H$_2$SO$_4$, reated with saturated sodium chloride solution, and extracted with methylene chloride. After drying with potash, the methylene chloride is evaporated off completely. 25 g. of a light brown highly viscous oil is obtained. The ester has the following formula as derived from the proportions of the starting materials and the molecular weight of 900 determined by osmosis:

I
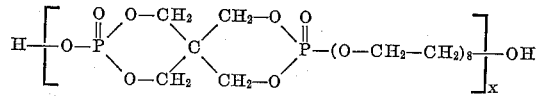

X in the above formula represents the degree of condensation. In this example, it was found that X averages 1.5, that is, one half of the molecules had a degree of condensation of 1 while the other half had a degree of condensation 2. If the reaction time is increased, the degree of condensation X also increases. Also, if the amount of octaethylene glycol used for the reaction is increased up to 2 moles there is obtained a condensation product in which both end groups are esterified with

radicals.

EXAMPLE II 19.4 g. of tetraethylene glycol, 31.2 g. of pyridine and 30 g. of the ester chloride obtained in Example I above are reacted as described in Example Ib and worked up. 27 g. of a viscous light brown oil are obtained. The color may be removed from a 10% aqueous solution by means of active charcoal and bleaching earth. The oily liquid consists primarily of a compound of the following formula:

II

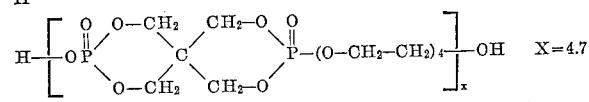

The variation of the reaction time and proportion of component has the same effect on X and the end groups as disclosed in connection with Compound Ib.

EXAMPLE III

An ester is prepared by a similar method to that used for Compound (Ib) by reacting 28.2 g. of hexaethylene glycol and 31.2 g. of pyridine with 30 g. of ester chloride (Ia). Yield 17 g. The formula for the end product is:

III

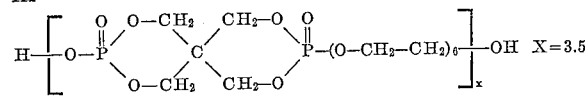

EXAMPLE IV 41.4 g. of nonaethylene glycol, 31.2 g. of pyridine and 30 g. of ester chloride (Ia) reacted as in the above examples produce 20 g. of a brown syrupy polycondensate which is diluted with water to a 10% solution and purified with active charcoal and bleaching earth. The following formula represents the highly viscous polycondensate:

V

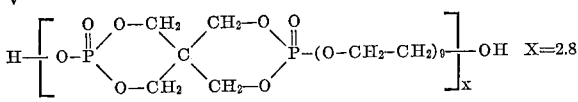

EXAMPLE V 75.7 g. of polyethylene glycol (with 34 oxyethylene units), 15.6 g. of pyridine and 15 g. of ester chloride (Ia) are stirred for 2 hours at room temperature and for 1 hour at 40° C. with exclusion of moisture. The viscous reaction mixture is then poured onto ice and slightly acidified with 2 N-sulphuric acid and extracted with methylene chloride. After evaporating off the methylene chloride, 36 g. of a semi-solid mass are obtained. The following formula represents the reaction product:

V

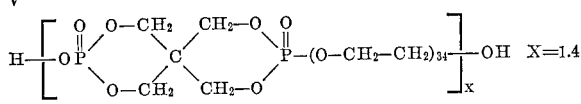

EXAMPLE VI

Spirocyclic carbon compounds used for comparison in this example were prepared as described below:

*Compound A*

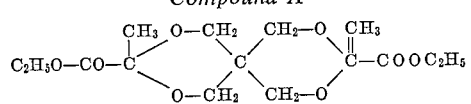

Preparation: From pentaerythritol, pyruvic acid and ethanol (Ber. 61 (1928), page 1856).

*Compound B*

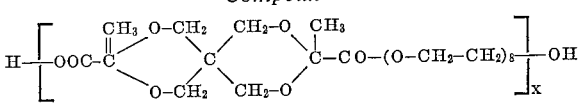

16.6 g. of Compound A and 18.5 g. of octaethylene glycol are heated for 2 hours at 150° C. in the presence of 0.2 g. of sodium methylate, the ethyl alcohol which is liberated distilling off. This reaction product is diluted with water to a 10% solution and neutralized with 1 N hydrochloric acid. Osmotic determination of the molecular weight indicated that the value of X was 2.

A gelatine-silver halide emulsion the silver halide of which contains 15 mole percent of AgBr and 85 mole percent of AgCl is washed and then ripened to maximum sensitivity and 4-hydroxy-6-methyl-1,3,3a,7-tetrazaindole or other stabilizers, and a wetting agent, for example, 10 ml. of a 4% aqueous solution of saponine are then added, and the emulsion is poured onto a suitable film base (Experiment A). In parallel experiments, the following substances, used as casting additives, are added to the emulsion per mole of silver halide.

|  | Mg. |
|---|---|
| Experiment B: Octaethylene glycol | +80 |
| Experiment C: Compound B | +80 |
| Experiment D: Compound of Example Ib | +80 |

All the samples are illuminated in a sensitometer behind a grey step wedge and developed for 5 minutes at 18° C. in a developer of the following composition:

|  | G. |
|---|---|
| Anhydrous sodium sulphite | 30 |
| Boric acid | 7.5 |
| Hydroquinone | 22.5 |
| Potassium metabisulphite | 2.5 |
| Paraformaldehyde | 7.5 |
| Potassium bromide | 1.5 | diluted to 1 liter with water.

|  | Gamma | Fog |
|---|---|---|
| Result: | | |
| Experiment A (no additive) | 6 | 0.04 |
| Experiment B | 6 | 0.04 |
| Experiment C | 6 | 0.04 |
| Experiment D | 15 | 0.04 |

The other compounds falling within the general formula also show similar results.

EXAMPLE VII

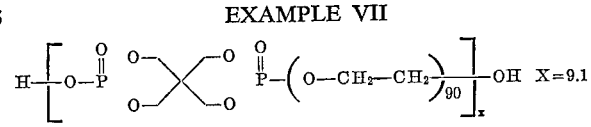

6 g. of Compound Ia and 40 g. of a polyethylene glycol consisting of 90 ethylene ether units are heated in a vacuum of about 15 mm. of mercury to a temperature of 100 to 120° C. while stirring hydrogen chloride escapes in large quantities. After the reaction is completed, the reaction mixture is made neutral with a methanolic sodium alcoholic solution. The alcohol is removed again in vacuo. 42 g. of a colorless, waxy product are obtained.

What we claim is:

1. A compound of the formula:

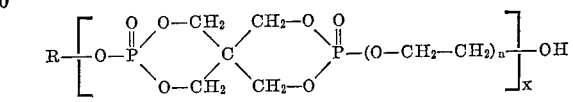

wherein n stands for from 3 to 100, X stands for from 1 to 100 and R is a member selected from the group consisting of hydrogen and the group $$H{+}O{-}CH_2{-}CH_2{)}_n$$

wherein $n$ is defined as above.

2. The compound according to claim 1 wherein $n$ stands for from 4 to 50 and X stands for from 1 to 10.

3. The compound according to claim 2 wherein R stands for hydrogen.

4. The compound according to claim 2 wherein R stands for the group $H{+}O{-}CH_2{-}CH_2{)}_n$.

No references cited.

CHARLES B. PARKER, *Primary Examiner.*

ANTON H. SUTTO, *Assistant Examiner.*